Patented Aug. 7, 1934

1,969,600

UNITED STATES PATENT OFFICE 1,969,600

METHOD OF SACCHARIFYING CELLULOSE-CONTAINING SUBSTANCES, SUCH AS WOOD, BY MEANS OF MINERAL ACIDS

Eduard Färber and Friedrich Koch, Heidelberg, Germany

No Drawing. Application August 23, 1932, Serial No. 630,154. In Germany July 7, 1931

4 Claims. (Cl. 127—37)

When cellulose-containing material, such as wood is saccharified in accordance with the known processes by disintegration with mineral acids, then in addition to the soluble carbo-hydrates which are produced acetic acid is also formed in quantities which depend for the most part upon the nature of the vegetable material. According to this invention this acetic acid is rendered utilizable for disintegrating the cellulose with the consequence that the consumption of acid necessary is diminished. This is effected by returning the acetic acid into the disintegrating process until its concentration is very much increased. Only then is the newly formed acetic acid withdrawn at suitable points of the process and recovered.

For example, during the saccharification of conifers by means of concentrated hydro-chloric acid, acetic acid is formed to the extent of about 4% of the quantity of dry wood employed. The sugar solutions containing hydro-chloric acid, which are obtained by disintegration with the aid of concentrated hydro-chloric acid in accordance with the known methods, contain about 30% of sugar and approximately 1.8% of acetic acid. On evaporating these solutions the acetic acid for the most part passes over into the hydro-chloric acid distillate, which latter after replenishing with hydro-chloric acid gas is returned for disintegrating purposes. Since, in accordance with the invention, the waste hydrochloric acid containing acetic acid which arises in the saccharification of wood is employed in this manner for a period for disintegrating fresh quantities of wood, disintegration liquids are obtained having an acetic acid content which gradually becomes higher and higher. It has been found that acetic acid contributes towards and raises the disintegrating capabilities of the hydro-chloric acid such that for four parts of acetic acid present in the solution one part of hydrogen chloride can be saved from the concentration which is otherwise necessary for the disintegration. If therefore the acetic acid, for instance, is brought to a concentration of 12 wt.-%, then this acid need contain only 37 wt.-% of hydrogen chloride in addition in order to make it equivalent as far as disintegration is concerned with a hydro-chloric acid containing 40% hydrogen chloride which is free from acetic acid. Thus the consumption of hydrogen chloride which is necessary for the disintegrating operation is diminished to about 8% of the quantity which is otherwise in circulation. In addition the sugar solutions which are formed as the result of the disintegration are substantially poorer in hydrogen chloride than is otherwise the case. As a result their permanency and the stability of the sugar during the evaporation of these solutions are substantially improved.

When the condition is reached that the most favourable quantity of acetic acid is present in the disintegrating solution then one begins each time to withdraw the acetic acid coming from the freshly disintegrated material out of circulation. It is removed for example, from the condensate which is produced during the vapourization of wood sugar solutions by a fractional distillation operation.

A portion of the acetic acid is bound by the non-saccharifiable portion of the cellulose-containing materials since the lignin is partly acetylated by hydro-chloric acid which is rich in acetic acid. This is of particular advantage for certain purposes for which lignin is used. The acetic acid bound therewith, however, may also be split off for example by heating under pressure to 110–112° C. with 2% hydro-chloric acid.

It is already known that cellulose-containing substances, such as wood, instead of being disintegrated with mineral acids may also be disintegrated with organic acids like formic acid or acetic acid if these latter are allowed to act on the cellulose-containing substances in the presence of a small quantity of mineral acids (about 15–20%) while heating. The mineral acid which is added acts in the nature of a catalyst. The esterification by the organic acid which otherwise takes place is prevented from hindering the saccharification by the addition of comparatively small quantities of mineral acid. For carrying out this process very large quantities of organic acid are necessary, the mixture must be allowed to stand for several hours and thereupon heated for some hours to 45° and above. This known process therefore is both time consuming and expensive.

In contradistinction thereto, in the process according to the invention the disintegration is carried out as usual with mineral acid at the ordinary temperature. Organic acid is not added but it is formed as the by-product during disintegration. It is allowed to accumulate in order thereby to economize in mineral acid and finally an excess of acetic acid may be obtained.

What we claim is:—

1. In the method of saccharifying cellulose-containing substances, such as wood, with a disintegration liquor containing hydrochloride acid, in which the liquor resulting from a saccharification is distilled and the distillate itself employed as a disintegration liquor for cellulose-containing material, the step of adjusting the composition of the distillates prior to its employment as a disintegrating liquor so that for each 1% of acetic acid it has acquired as a result of the saccharification immediately preceding, its hydrochloric acid concentration is about 0.25% less than at the commencement of that saccharification.

2. A method of saccharifying cellulose-containing substances, such as wood, consisting in disintegrating cellulose-containing material with concentrated hydrochloric acid, separating the sugar from the resulting liquor by distilling off the acid liquid, adjusting the hydrochloric acid content of the distillate so that for each 1% of acetic acid it has acquired as a result of the preceding saccharification its hydrochloric acid concentration is about 0.25% less than before the saccharification and then using it for disintegrating cellulose-containing material, and continuing in the same way with the liquor resulting from this disintegraton.

3. A method of saccharifying cellulose-containing substances, such as wood, consisting in disintegrating cellulose-containing material with concentrated hydrochloric acid, separating the sugar from the resulting liquor by distilling off the acid liquid, adjusting the hydrochloric acid content of the distillate so that for each 1% of acetic acid it has acquired as a result of the preceding saccharification its hydrochloric acid concentration is about 0.25% less than before the saccharification and then using it for disintegrating cellulose-containing material, and continuing in the same way with the liquor resulting from this disintegration until the acetic acid content of the acid distillate exceeds 12%, after which the composition of the liquor is always adjusted prior to its use for disintegration purposes so that its acetic acid content does not exceed 12%.

4. A method of saccharifying cellulose-containing substances, such as wood, consisting in disintegrating cellulose-containing material with concentrated hydrochloric acid, separating the sugar from the resulting liquor by distilling off the acid liquid, adjusting the hydrochloric acid content of the distillate so that for each 1% of acetic acid it has acquired as a result of the preceding saccharification its hydrochloric acid concentration is about 0.25% less than before the saccharification and then using it for disintegrating cellulose-containing material and continuing in the same way with the liquor resulting from this disintegration until the acetic acid content of the acid distillate exceeds 12%, after which the composition of the liquor is always adjusted prior to its use for disintegration purposes by removal of acetic acid until the latter does not exceed 12%.

FRIEDRICH KOCH.
EDUARD FÄRBER.